(12) United States Patent  (10) Patent No.: US 9,104,349 B2
Sakata  (45) Date of Patent: Aug. 11, 2015

(54) ELECTRONIC APPARATUS

(71) Applicant: KYOCERA Document Solutions Inc.

(72) Inventor: Hiromi Sakata, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/524,334

(22) Filed: Oct. 27, 2014

(65) Prior Publication Data

US 2015/0116771 A1  Apr. 30, 2015

(30) Foreign Application Priority Data

Oct. 31, 2013  (JP) ................................. 2013-226597

(51) Int. Cl.
G06F 15/00 (2006.01)
G06F 3/12 (2006.01)
G06K 1/00 (2006.01)

(52) U.S. Cl.
CPC ............ *G06F 3/1205* (2013.01); *G06F 3/1238* (2013.01); *G06F 3/1258* (2013.01)

(58) Field of Classification Search
CPC .... G06F 3/1205; G06F 3/1258; G06F 3/1238
USPC .................................................. 358/1.1–1.15
See application file for complete search history.

(56) References Cited

U.S. PATENT DOCUMENTS 8,279,467 B2 * 10/2012 Mitsui ........................... 358/1.15
8,284,244 B2 * 10/2012 Iwasaki et al. .................. 348/68

FOREIGN PATENT DOCUMENTS

JP  2012-221505  11/2012

* cited by examiner

*Primary Examiner* — Douglas Tran

(57) ABSTRACT

A log managing unit identifies respective required time lengths for user operations performed to set setting values to plural setting items until a function is performed, and stores a setting operation log. An assistance function managing unit extracts at least one of (a) setting operation logs that include user operations returning to an initial screen of the function without setting the setting values after a user operation is performed to the initial screen, (b) setting operation logs that a required time length per step of the user operations on the basis of the required time lengths exceeds a predetermined value, and (c) setting operation logs that a total required time length of the required time lengths until the setting values are set exceeds a predetermined value, and registers to an operation assistance function a predetermined number of setting items with longest required time lengths in the extracted setting operation logs.

4 Claims, 5 Drawing Sheets

ELECTRONIC APPARATUS

CROSS-REFERENCE TO RELATED APPLICATIONS

This application relates to and claims priority rights from Japanese Patent Application No. 2013-226597, filed on Oct. 31, 2013, the entire disclosures of which are hereby incorporated by reference herein.

BACKGROUND

1. Field of the Present Disclosure

The present disclosure relates to an electronic apparatus.

2. Description of the Related Art

Due to recent multifunctionality of image forming apparatuses, user operations to use an image forming apparatus are gradually complicated. Therefore, as means for improving the operability, an image forming apparatus is equipped with an operation assistance function such as a panel program or a one-touch key. In such function, user's operation burden is reduced by registering a specific function or a series of functions to a specific key in advance.

In an image forming apparatus, an administrator registers a program or a work flow to execute plural operations and proposes the registered program or work flow to a user.

Although it is possible to propose the use of the aforementioned operation assistance function, the number of substitution user operations (e.g. setting a setting value to a setting item) that can be registered in the operation assistance function is limited and consequently proper substitution user operations may not be registered.

SUMMARY

An electronic apparatus according to an aspect of the present disclosure includes a display device, an input device, a log managing unit, and an assistance function managing unit. The display device is configured to display an operation screen to a user. The input device is configured to receive a user operation inputted by the user. The log managing unit is configured to identify respective required time lengths for user operations performed to set setting values to plural setting items until a function is performed, and store a setting operation log, the setting operation log including a series of user operations performed until the setting values are set, the setting items, and the respective required time lengths for the user operations. The assistance function managing unit is configured to extract at least one of (a) setting operation logs that include user operations returning to an initial screen of the function without setting the setting values after a user operation is performed to the initial screen, (b) setting operation logs that a required time length per step of the user operations on the basis of the required time lengths exceeds a predetermined value, and (c) setting operation logs that a total required time length of the required time lengths until the setting values are set exceeds a predetermined value, and register setting items to an operation assistance function, the setting items being a predetermined number of setting items with longest required time lengths among setting items in the extracted setting operation logs.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
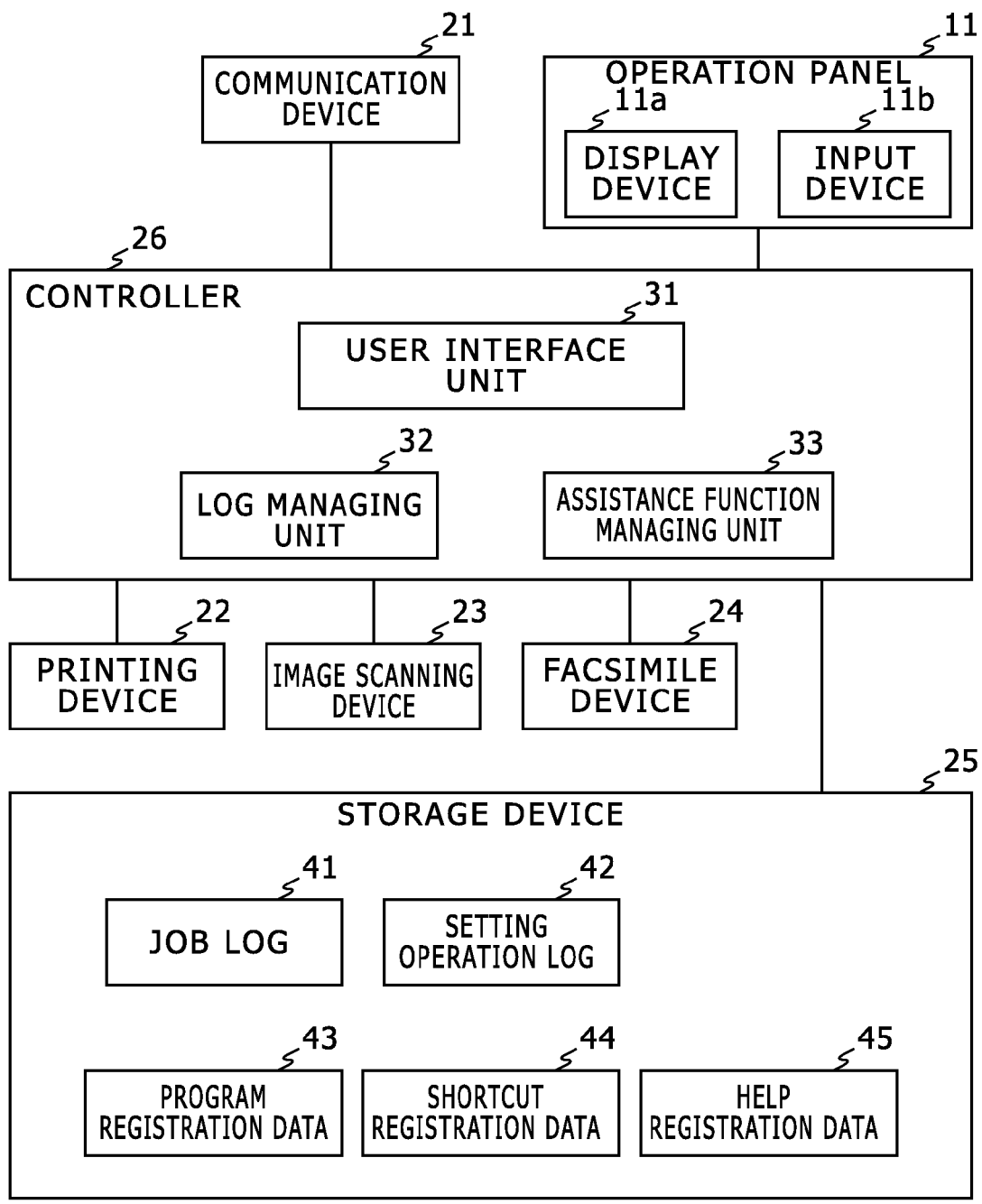
FIG. 1 shows a block diagram that indicates a configuration of an image forming apparatus as an example of an electronic apparatus according to an embodiment of the present disclosure.

FIG. 1 shows a block diagram that indicates a configuration of an image forming apparatus as an example of an electronic apparatus according to an embodiment of the present disclosure.

In this embodiment, the image forming apparatus shown in FIG. 1 is a multi function peripheral that has a printing function, an image scanning function, and a facsimile function. This image forming apparatus includes an operation panel 11, a communication device 21, a printing device 22, an image scanning device 23, a facsimile device 24, a storage device 25, and a controller 26.

The operation panel 11 includes a display device 11a such as a liquid crystal display and an input device 11b such as a touch panel, and displays an operation screen for a user and detects a user operation. The display device 11a displays an operations screen to a user and the input device 11b receives a user operation inputted by the user.

Figure 2:
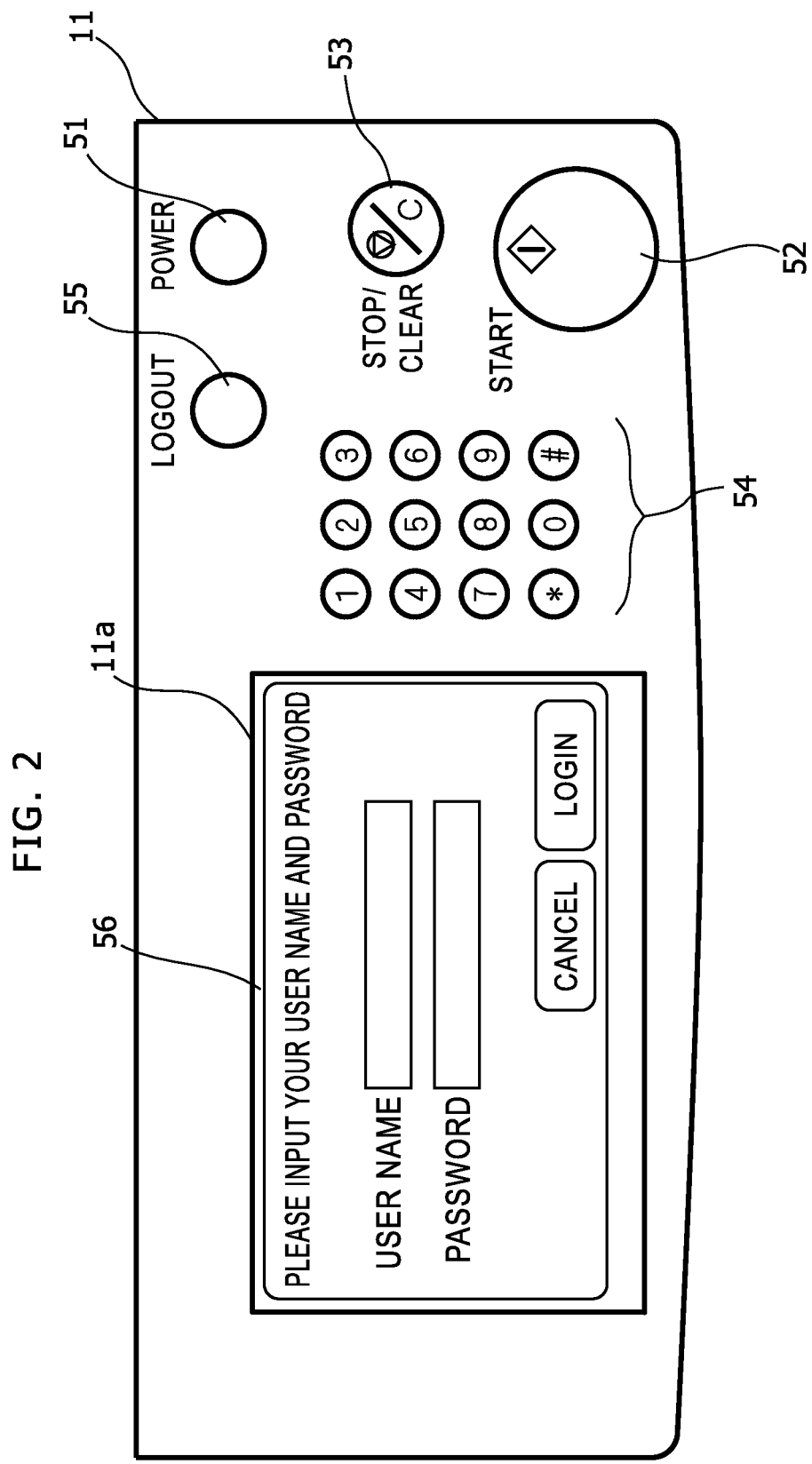
FIG. 2 shows a front view of an operation panel 11 in FIG. 1.

FIG. 2 shows a front view of the operation panel 11 in FIG. 1. The operation panel 11 shown in FIG. 2 includes hard keys 51 to 55 and a touch panel 56 as the input device 11b. The hard key 51 is a POWER key, the hard key 52 is a START key, the hard key 53 is a STOP/CLEAR key, the hard keys 54 are numeric keys, the hard key 55 is a LOGOUT key. The touch panel 56 is arranged on a surface of the display device 11a.

Further, the communication device 21 is a device capable of connecting through a network or the like to an unshown host device and performing data communication in accordance with a predetermined communication protocol.

Furthermore, the printing device 22 is an internal device that prints a document image on a printing paper sheet, for example, in an electrophotographic manner.

Furthermore, the image scanning device 23 is an internal device that optically scans a document image from a document, and generates image data of the document image.

Furthermore, the facsimile device 24 is an internal device that has a receiving function that receives a facsimile signal and converts the facsimile signal to image data and a transmitting function that converts image data to a facsimile signal and transmits the facsimile signal.

Furthermore, the storage device 25 is a non volatile storage device such as a hard disk drive or a flash memory, and stores data, a program and the like.

Furthermore, the controller 26 includes a computer that includes a CPU (Central Processing Unit), a ROM (Read Only Memory), a RAM (Random Access Memory) and the like not shown, loads a program stored in the ROM or the storage device 25 to the RAM, and executes the program with the CPU to act as various processing units.

In this embodiment, the controller 26 acts as a user interface unit 31, a log managing unit 32, and an assistance function managing unit 33.

Further, in the storage device 25, a job log 41 and a setting operation log 42 is stored every time when the image forming apparatus performs a job of each function (e.g. a copy function).

The user interface unit 31 causes the display device 11a of the operation panel 11 to display a screen, and changes a screen displayed on the display device 11a in accordance with an inputted operation detected by the input device 11b of the operation panel 11.

Figure 3:
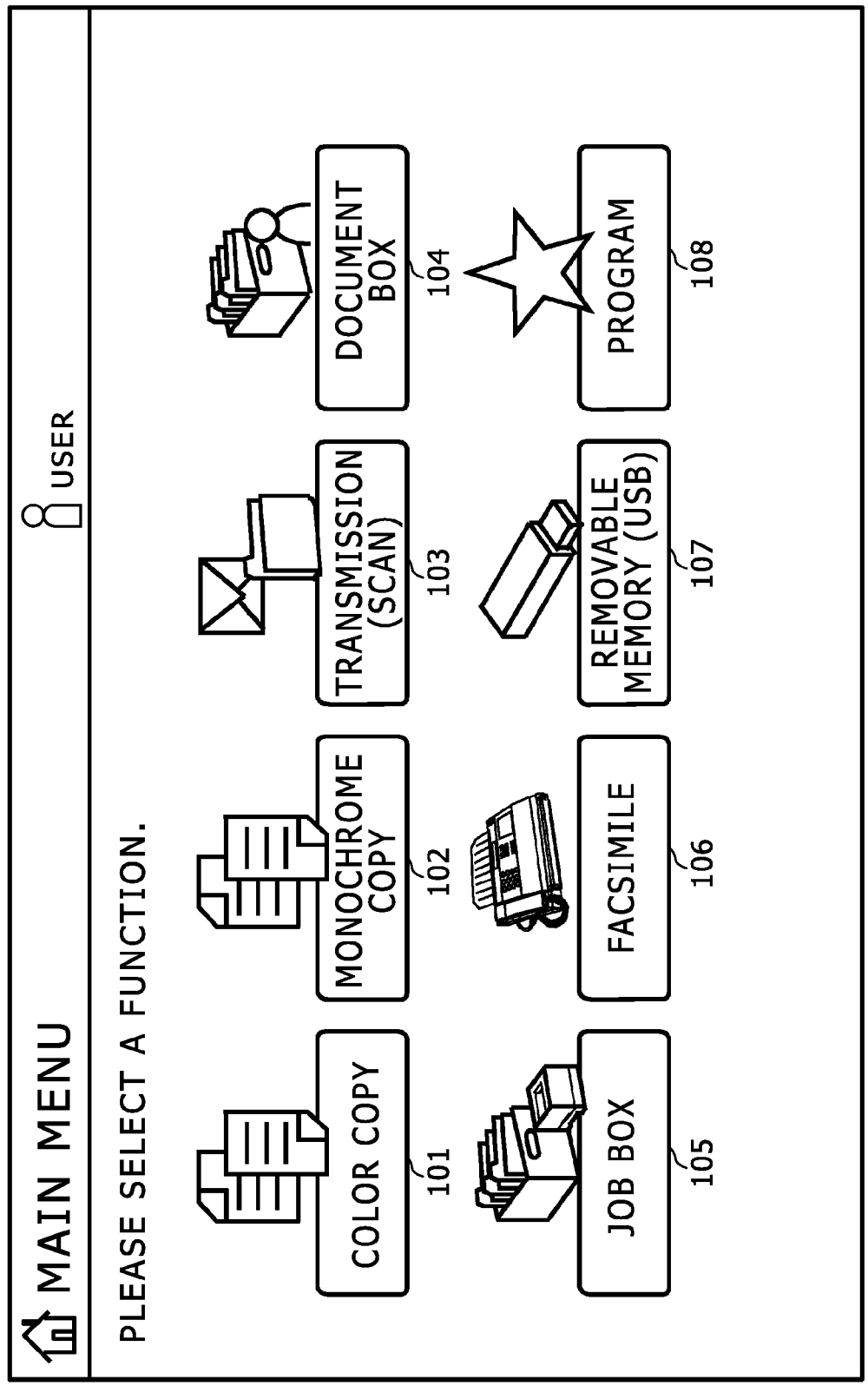
FIG. 3 shows a diagram that indicates an example of a main menu screen.
Figure 4:
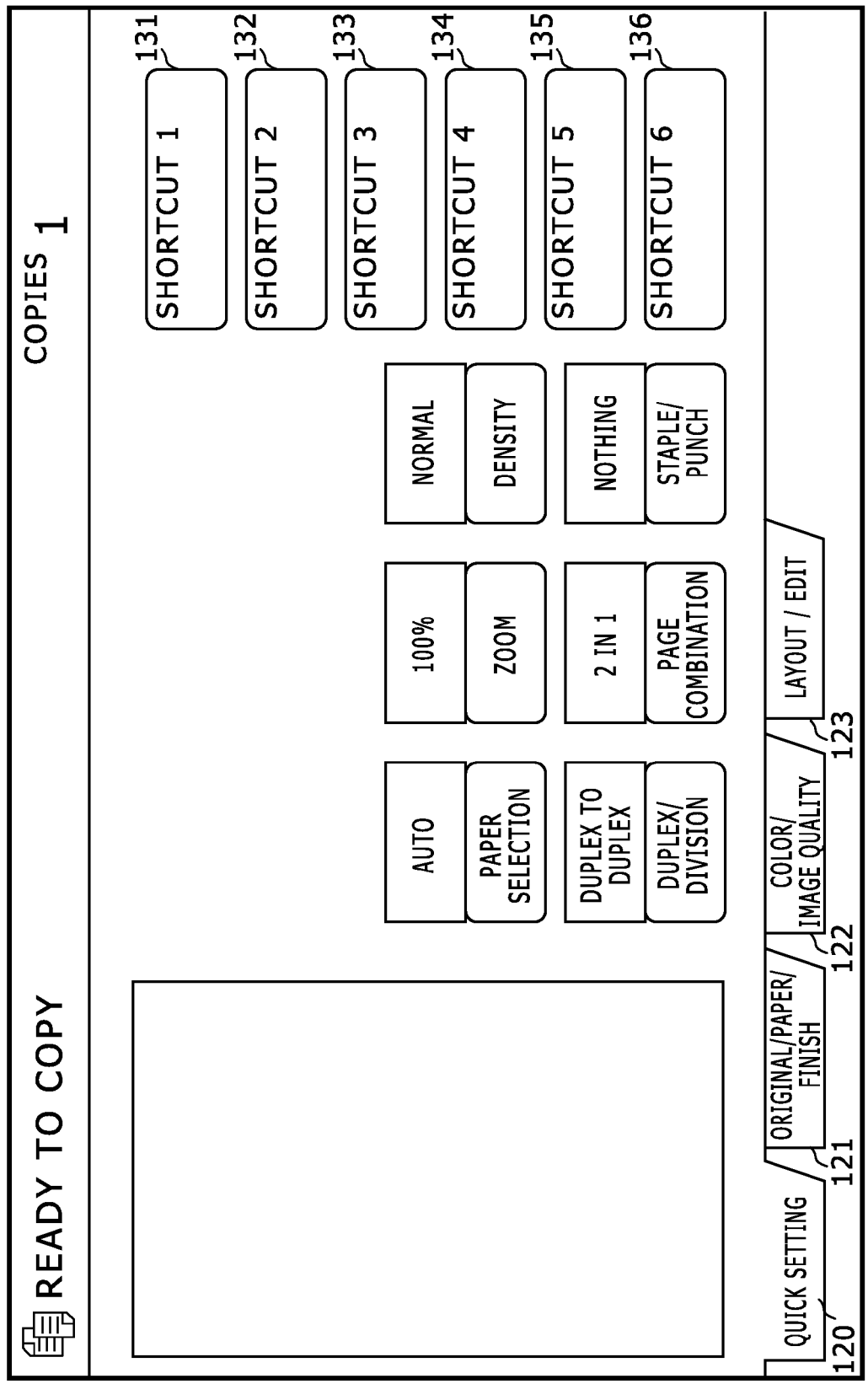
FIG. 4 shows a diagram that indicates an example of a setting screen of a copy function.

FIG. 3 shows a diagram that indicates an example of a main menu screen. FIG. 4 shows a diagram that indicates an example of a setting screen of a copy function.

In the image forming apparatus 1, after a user logs in on a login screen shown in FIG. 2, the user interface unit 31 firstly causes the display device 11a to display a main menu screen as shown in FIG. 3. In the main menu screen, displayed are icons 101 to 107 of sorts of functions such as copy function and transmission function, and a program icon 108 to display a list screen of programs.

When the icon 101 or 102 of a copy function is pressed down in the main menu screen shown in FIG. 3, the user interface unit 31 causes the display device 11a to display a setting screen of the copy function shown in FIG. 4. The setting screen of the copy function includes tabs 120 to 123 of respective setting items, and shortcut keys 131 to 136 are displayed in the setting screen.

The log managing unit 32 identifies respective required time lengths for user operations performed to set setting values to plural setting items until a function is performed, and stores a setting operation log 42 in the storage device 25. The setting operation log 42 includes a series of user operations performed until the setting values are set, the setting items, and the respective required time lengths for the user operations.

When in the main menu, a series of setting operations occurs including pressing down a copy function button, pressing down the tab 121, pressing down the tab 123, pressing down a page number button (a setting item included in the tab 123, not shown), and pressing down a cancel button (a setting item included in the page number setting screen, not shown), the required time lengths are identified such as 1 second for pressing down the tab 121, 2 seconds for pressing down the tab 123, 1 second for pressing down the page number button, and 2 seconds for pressing down the cancel button, for example.

The assistance function managing unit 33 extracts at least one (here, all of the following three types) of (a) setting operation logs that include user operations returning to an initial screen of a function without setting setting values after a user operation is performed to the initial screen, (b) setting operation logs that a required time length per step of the user operations on the basis of the required time lengths exceeds a predetermined value, and (c) setting operation logs that a total required time length of the required time lengths until the setting values are set exceeds a predetermined value, and registers setting items to an operation assistance function. The setting items to be registered are a predetermined number of setting items with longest required time lengths among setting items in the extracted setting operation logs.

The operation assistance function includes at least one (here, all of the following three types) of (a) a program function that enables one user operation to a program key to input setting values to setting items, (b) a shortcut function that enables one user operation to a shortcut key to jump to a setting screen of a setting item, and (c) a help function to display explanation of a setting item selected from a setting item list.

In the storage device 25, program registration data 43, shortcut registration data 44, and help registration data 45 are stored as registration data of the operation assistance function. The program registration data 43 indicates setting items related to a program key of the program function and setting values of the setting items. The shortcut registration data 44 indicates a setting screen of a setting item related to a shortcut key of the shortcut function. The help registration data 45 includes a setting item list and respective explanations (a text, a figure or the like) of setting items in the setting item list.

When registering setting items to the operation assistance function, the assistance function managing unit (a) registers to the shortcut function the predetermined number of the setting items (hereinafter called "lost items") obtained from the setting operation logs that include user operations returning to an initial screen of the function without setting the setting values after a user operation is performed to the initial screen, (b) registers at the top of the setting item lists of the help function the predetermined number of the setting items (hereinafter called "insufficient navigation items") that are not registered in the shortcut function and are obtained from the setting operation logs that a required time length per step of the user operations on the basis of the required time lengths exceeds a predetermined value, and (c) registers to the program function the predetermined number of the setting items (hereinafter called "long setting time items") that are not registered neither in the shortcut function nor at the top of the setting item list and are obtained from the setting operation logs that a total required time length of the required time lengths until the setting values are set exceeds a predetermined value.

It should be noted that the assistance function managing unit 33 repeatedly analyzes the setting operation logs 42 as mentioned, and renews the program registration data 43, the shortcut registration data 44, and the help registration data 45 on the basis of the analysis result at regular intervals.

The following part explains a behavior of the aforementioned image forming apparatus.

Every time when a job of a function such as the copy function is performed, the log managing unit 32 identifies user operations performed to determine setting values of setting items for the job and respective required time lengths of the user operations using the user interface unit 31, and stores in the storage device 25 the setting operation log 42 that indicates the setting items, the user operations, and the required time lengths.

Figure 5:
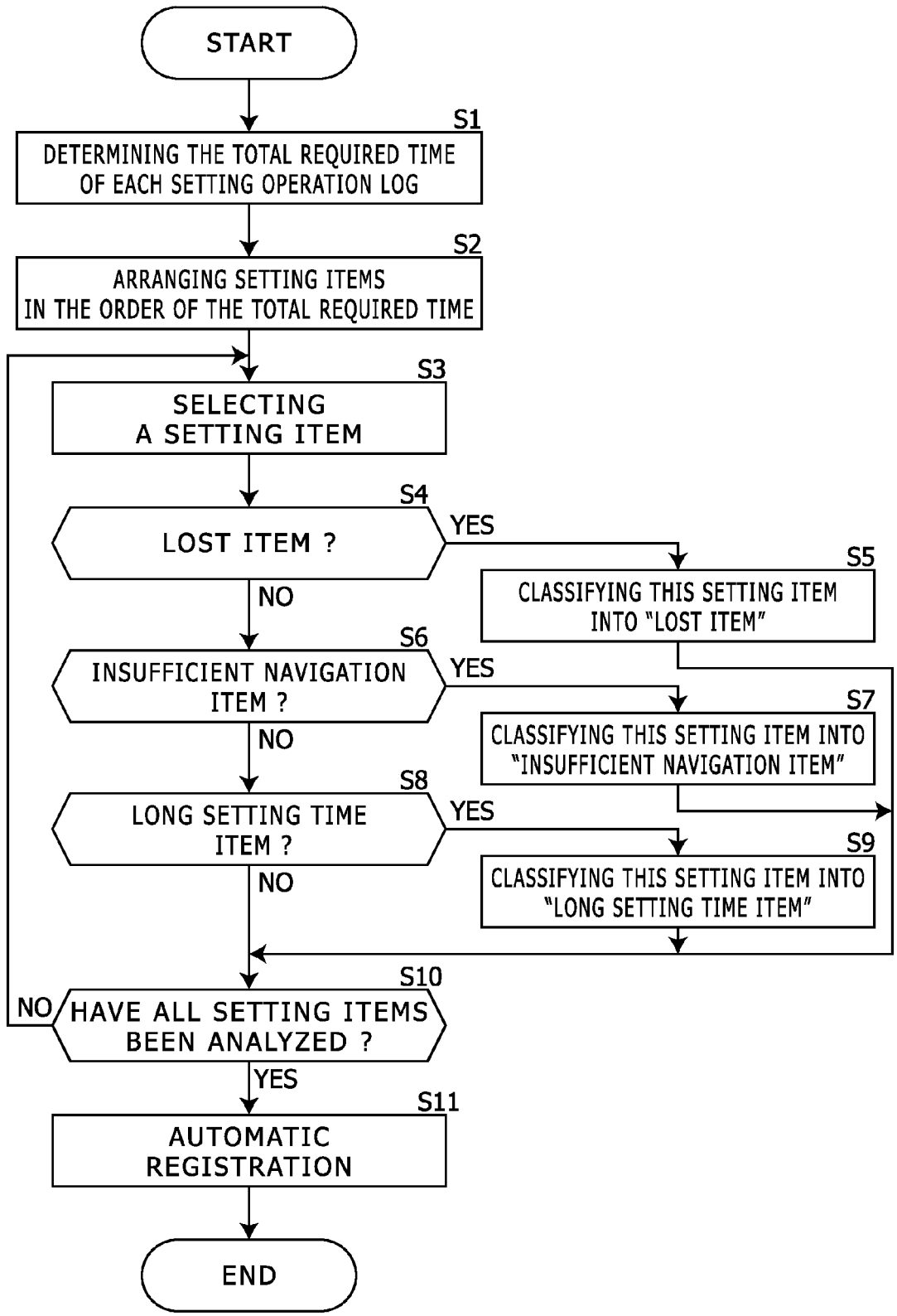
FIG. 5 shows a flowchart that explains analysis of setting operation logs 42 and renewal of registration data 43 to 45 of an operation assistance function.

On the other hand, the assistance function managing unit 33 repeatedly performs the analysis of the setting operation logs 42 and the renewal of the registration data to 45 of the operation assistance function at regular intervals in the following manner. FIG. 5 shows a flowchart that explains analysis of setting operation logs 42 and renewal of registration data 43 to 45 of an operation assistance function.

Firstly, the assistance function managing unit 33 identifies the respective total required time lengths of the plural setting operations logs 42 (in Step S1). The total required time length is a time length until an operation (e.g. pressing down an OK button to fix setting values, or the like) to fix setting values of setting items is performed.

The assistance function managing unit 33 arranges setting items in the plural setting operation logs 42 in the descending order of the total required time lengths (in Step S2).

Subsequently, the assistance function managing unit 33 selects a setting item from the arranged setting items one by one in the descending order of the total required time lengths (in Step S3).

The assistance function managing unit 33 determines whether the selected setting item is an aforementioned "lost item" or not (in Step S4) and, if it is determined that the selected setting item is an aforementioned "lost item", classifies the selected setting item into "lost item" (in Step S5). In such a case, the selected setting item is added at the end of a lost item list.

If it is determined that the selected setting item is not a "lost item", the assistance function managing unit 33 determines whether the selected setting item is an aforementioned "insufficient navigation item" or not (in Step S6) and, if it is determined that the selected setting item is an aforementioned "insufficient navigation item", classifies the selected setting item into "insufficient navigation item" (in Step S7). In such a case, the selected setting item is added at the end of an insufficient navigation item list.

If it is determined that the selected setting item is not an "insufficient navigation item", the assistance function managing unit 33 determines whether the selected setting item is an aforementioned "long setting time item" or not (in Step S8) and, if it is determined that the selected setting item is an aforementioned "long setting time item", classifies the selected setting item into "long setting time item" (in Step S9). In such a case, the selected setting item is added at the end of a long setting time item list.

Subsequently, the assistance function managing unit 33 determines whether the aforementioned analysis has been performed for all of the arranged setting items or not (in Step S10) and, if there is a setting item for which the analysis has not been performed, selects a setting item for which the analysis has not been performed (in Step S3), and performs the aforementioned analysis for this setting item in the same manner.

If the aforementioned analysis has been performed for all of the arranged setting items, the assistance function managing unit 33 performs an automatic registration process (in Step S11).

In the automatic registration process, the assistance function managing unit 33 (a) renews the shortcut registration data 44 with a predetermined number of top setting items in the lost item list, (b) renews the help registration data 45 so as to insert a predetermined number of top setting items in the insufficient navigation item list to the top of the setting item list of the help function, and (c) renews the program registration data 43 with a predetermined number of top setting items in the long setting time item list.

In the aforementioned embodiment, the log managing unit 32 identifies respective required time lengths for user operations performed to set setting values to plural setting items until a function is performed, and stores a setting operation log 42. The setting operation log 42 includes a series of user operations performed until the setting values are set, the setting items, and the respective required time lengths for the user operations. The assistance function managing unit 33 extracts at least one of (a) setting operation logs that include user operations returning to an initial screen of the function without setting the setting values after a user operation is performed to the initial screen, (b) setting operation logs that a required time length per step of the user operations on the basis of the required time lengths exceeds a predetermined value, and (c) setting operation logs that a total required time length of the required time lengths until the setting values are set exceeds a predetermined value, and registers setting items to an operation assistance function. The setting items to be registered are a predetermined number of setting items with longest required time lengths among setting items in the extracted setting operation logs.

Therefore, setting items that a user met some difficulties are automatically extracted, and such appropriate setting items are automatically registered to the operation assistance function so as to effectively reduce user workload.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An electronic apparatus, comprising:
a display device configured to display an operation screen to a user;
an input device configured to receive a user operation inputted by the user;
a log managing unit configured to identify respective required time lengths for user operations performed to set setting values to plural setting items until a function is performed, and store a setting operation log, the setting operation log including a series of user operations performed until the setting values are set, the setting items, and the respective required time lengths for the user operations; and
an assistance function managing unit configured to extract at least one of (a) setting operation logs that include user operations returning to an initial screen of the function without setting the setting values after a user operation is performed to the initial screen, (b) setting operation logs that a required time length per step of the user operations on the basis of the required time lengths exceeds a predetermined value, and (c) setting operation logs that a total required time length of the required time lengths until the setting values are set exceeds a predetermined value, and register setting items to an operation assistance function, the setting items being a predetermined number of setting items with longest required time lengths among setting items in the extracted setting operation logs.

2. The electronic apparatus according to claim 1, wherein the operation assistance function includes at least one of (a) a program function that enables one user operation to a program key to input setting values to setting items, (b) a shortcut function that enables one user operation to a shortcut key to jump to a setting screen of a setting item, and (c) a help function to display explanation of a setting item selected from a setting item list.

3. The electronic apparatus according to claim 2, wherein the assistance function managing unit is further configured (a) to register to the shortcut function the predetermined number of the setting items obtained from the setting operation logs that include user operations returning to an initial screen of the function without setting the setting values after a user operation is performed to the initial screen, and (b) to register at the top of the setting item lists of the help function the predetermined number of the setting items that are not registered in the shortcut function and are obtained from the setting operation logs that a required time length per step of the user operations on the basis of the required time lengths exceeds a predetermined value.

4. The electronic apparatus according to claim 3, wherein the assistance function managing unit is further configured (c) to register to the program function the predetermined number of the setting items that are not registered neither in the shortcut function nor at the top of the setting item list and are obtained from the setting operation logs that a total required time length of the required time lengths until the setting values are set exceeds a predetermined value.

* * * * *